(12) United States Patent
Sundermann

(10) Patent No.: US 8,197,206 B2
(45) Date of Patent: Jun. 12, 2012

(54) APPARATUS FOR GENERATING ELECTRICITY FROM A FLOW OF WATER SUCH AS A TIDE, RIVER OR THE LIKE

(75) Inventor: Frederick Herman Sundermann, Heyfield (AU)

(73) Assignee: Sundermann Water Power Ltd, Victoria (AU)

( * ) Notice: Subject to any disclaimer, the term of this patent is extended or adjusted under 35 U.S.C. 154(b) by 806 days.

(21) Appl. No.: 11/988,532

(22) PCT Filed: Jul. 5, 2006

(86) PCT No.: PCT/AU2006/000944
§ 371 (c)(1),
(2), (4) Date: Jan. 27, 2009

(87) PCT Pub. No.: WO2007/009155
PCT Pub. Date: Feb. 25, 2007

(65) Prior Publication Data
US 2009/0212572 A1    Aug. 27, 2009

(30) Foreign Application Priority Data
Jul. 15, 2005   (AU) ................................ 2005903768

(51) Int. Cl.
*F03D 3/06* (2006.01)
(52) U.S. Cl. .............................. 416/17; 416/41; 416/147
(58) Field of Classification Search .................... 416/17, 416/41, 147
See application file for complete search history.

(56) References Cited

U.S. PATENT DOCUMENTS
4,125,343 A * 11/1978 Olson ............................ 416/17
(Continued)

FOREIGN PATENT DOCUMENTS
CA          2453401 A1    1/2003
(Continued)

OTHER PUBLICATIONS

Search Report for related application No. PCT/AU2006/000944 www.bluenergy.com.pages.

(Continued)

*Primary Examiner* — Trung Q Dang
(74) *Attorney, Agent, or Firm* — Husch Blackwell LLP

(57) ABSTRACT

An apparatus for generating electrical power from a flow of water, including a housing having a water inlet and water outlet, a first turbine (12) mounted in the housing for rotation about a substantially vertical axis and having a turbine shaft, a set of vertical blades (22), and a blade angle control mechanism, a second turbine (14) mounted in the housing adjacent to the first turbine, for rotation about a substantially vertical axis, the second turbine having a turbine shaft, a set of vertical blades (22) and a blade angle control mechanism, the housing being adapted to be mounted within the body of water and being so configured that an incoming water flow enters the housing via the inlet, and is principally directed into two driving flows (34, 36), one for each turbine, and is then directed for discharge via the outlet, the angle of each blade with respect to the driving water flow is controlled by the blade angle control mechanism such that a large blade surface area is presented to the incoming water flow for driving the turbine in a predetermined direction of rotation and a low blade surface area is presented to the incoming water flow in a direction opposite to the driving direction.

17 Claims, 7 Drawing Sheets

U.S. PATENT DOCUMENTS

| | | | |
|---|---|---|---|
| 4,352,990 A | 10/1982 | Aucoin, Jr. | |
| 4,864,152 A | 9/1989 | Pedersen | |
| 5,324,169 A * | 6/1994 | Brown et al. | 416/83 |
| 5,844,323 A * | 12/1998 | Hung | 290/54 |
| 6,652,221 B1 | 11/2003 | Praenkel | |

FOREIGN PATENT DOCUMENTS

| | | |
|---|---|---|
| DE | 3702234 | 8/1988 |
| DE | 29617108 | 3/1997 |
| DE | 19708636 | 4/1998 |
| DE | 19715373 | 10/1998 |
| DE | 19741992 | 3/1999 |
| DE | 29823019 | 4/1999 |
| GB | 2256011 A | 11/1992 |
| GB | 2312931 | 11/1997 |
| GB | 2400413 A | 10/2004 |
| JP | 54126847 A | 5/1981 |
| JP | 55012218 | 9/1981 |
| JP | 62168970 A | 1/1989 |
| JP | 11280635 | 4/2001 |
| JP | 2002202042 A | 2/2004 |
| JP | 2004144021 A | 11/2005 |
| RU | 2047787 | 11/1995 |
| WO | WO83/00889 | 3/1983 |
| WO | WO 83/00889 | 3/1983 |
| WO | WO 92/03656 | 3/1992 |
| WO | WO92/03656 | 3/1992 |
| WO | WO02/066828 | 8/2002 |
| WO | WO 02/066828 | 8/2002 |
| WO | WO 2007/009155 | 1/2007 |

OTHER PUBLICATIONS

Australian International Search Report for PCT/AU2006/000944.

\* cited by examiner

APPARATUS FOR GENERATING ELECTRICITY FROM A FLOW OF WATER SUCH AS A TIDE, RIVER OR THE LIKE

This application claims priority from PCT/AU2006/000944 filed Jul. 5, 2006 and Australian Patent Application No. 2005903768 filed Jul. 15, 2005.

The present invention relates to an electricity generating apparatus powered by water flow such as tidal flow of sea water or a river flow.

There has been a focus on renewable electricity generation for domestic and commercial supply as an alternative to the traditional forms of electricity generation in recent years. The traditional forms of electricity generation, for example coal fired power stations, release large amounts of polluting gases such as carbon dioxide, to produce electricity. Renewable electricity, that generated by the sun, wind and water, is in use around the world but is not widely used in many countries.

Those using water flow as their source of energy to create electricity, often require a dam or similar artificial structure blocking the natural flow of the water. The set up costs and infrastructure requirements can be substantial and also adverse environmental effects can result, for example increased silting due to a reduced flow and flooding upstream of the dam.

Power generating systems which operate from a tidal flow of water without the use of a dam or other artificial structure, are exposed to a range of different water flows through the tidal cycle. Certain systems previously proposed for this usage are not effective at lower water velocities experienced within the tidal cycle and, accordingly, may be effective over perhaps no more than 50% of the tidal cycle.

The present invention seeks to provide a system which is capable of power generation over a greater portion of the tidal cycle.

Accordingly in one form of the present invention there is provided an apparatus for generating electrical power from a flow of water, including a housing having a water inlet and water outlet, a first turbine mounted in the housing for rotation about a substantially vertical axis and having a turbine shaft, a set of vertical blades, and a blade angle control mechanism, a second turbine mounted in the housing adjacent to the first turbine for rotation about a substantially vertical axis, the second turbine having a turbine shaft, a set of vertical blades, and a blade angle control mechanism, the housing being adapted to be mounted within the body of water and being so configured that an incoming water flow enters the housing via the inlet, and is principally directed into two driving flows, one for each turbine, and is then directed for discharge via the outlet, the angle of each blade with respect to the driving water flow is controlled by the blade angle control mechanism such that a large blade surface area is presented to the incoming water flow for driving the turbine in a predetermined direction of rotation and a low blade surface area is presented to the incoming water flow in a direction opposite to the driving direction.

Accordingly, the two turbines arranged one adjacent the other with the varying blade angles, enables the blade angles to be set to provide a large surface area for effective driving of the turbines even at reduced flow velocities as may be encountered during some parts of the tidal cycle.

In a preferred embodiment, the two turbines are coupled for synchronous rotation in opposite directions with the incoming water flow being directed towards an outer peripheral part of each turbine in which the large blade surface area is presented to the water flow. The two turbines are adjacent at their inner peripheral parts in which the low blade surface areas are presented to the incoming water. This not only minimises the effect of the incoming water at the inner peripheral parts (and which acts to counter the effect of that acting on the outer peripheral parts) it also acts to prevent blade interference between the two turbines in this zone.

Preferably, a deflector is provided in the water inlet to direct the incoming water flow into the two driving water flows towards the outer extremity of the housing, the apparatus having one or more baffles configured to restrict water flow through a central part of the housing where the two turbines are adjacent. A directed driving water flow towards the outer extremity of each turbine allows for the turbines to receive the more of the incoming water flow as a driving water flow.

Preferably, the blade angle control mechanism is operative to control the blade angle such that a low blade surface area is presented when the blade is moving through the central part of the housing, to reduce opposing forces acting on the turbine in the central part and to prevent interference between the blades of the two turbines in the central part.

In one embodiment of the present invention, each blade is mounted to a blade support structure of the turbine for pivotal movement about a substantially vertical axis and the blade angle control mechanism is operative to control such pivotal movement of the blade over at least part of its movement. Preferably, the blade angle control mechanism comprises a planetry gear system having a planet gear linked to a pivot shaft of each blade and engaged with a stationary sun gear co-axial with the turbine axis whereby the blades are pivoted to change their angles as the turbine rotates.

In another embodiment of the present invention, the blade angle control mechanism comprises a guide system co-operative with the blades as the turbine rotates. Preferably, each blade has a pivotal axis offset from a central axis of the blade and the guide system comprises a stationary guide engaged by an inner edge portion of the blade during rotation of the turbine during blade movement towards the outer extremity of the housing so as to control blade angle during such movement, the inner edge portion of the blade being held against the guide during such movement by forces acting on the blade as a result of its pivotal offset.

More preferably, after the blade has passed through the outer extremity of the housing, it is released from engagement with the guide and is held parallel to the direction of water flow by forces acting on the blade as a result of its pivotal offset. Preferably, the inner portion of each blade includes rollers engagable with the guide.

Preferably, the guide is, or forms part of, a baffle extending into the central part of the housing to restrict water flow therethrough. More preferably, the guide is of generally cylindrical form and extends from adjacent the base of the housing to an upper part of the housing.

In another form of the present invention there is provided an apparatus for generating electrical power from a flow of water, including a housing having a water inlet and water outlet, a turbine mounted in the housing for rotation about an axis and having a turbine shaft, a set of blades, and a blade angle control mechanism, the housing being adapted to be mounted within the body of water and being so configured that water flow enters the housing via the inlet, and is principally directed into a driving flow for the turbine, and is then directed for discharge via the outlet, wherein the angle of each blade with respect to the driving water flow is controlled by the blade angle control mechanism such that a large blade surface area is presented to the incoming water flow for driving the turbine in a predetermined direction of rotation and a low blade surface area is presented to the incoming water flow in a direction opposite to the driving direction.

In one version of the present invention the housing is carried by and/or forms part of a floating structure. In the installed condition, the apparatus will float on the body of water with the turbines immersed beneath the surface.

In another version of the present invention the housing in the installed condition is anchored adjacent the water bed. In this version the housing may include a flotation system which enables the apparatus to be floated on the body of water into the required location and then sunk onto or adjacent the water bed in that location.

In these versions, the generator(s) are positioned above the water level. In the version in which the apparatus floats on the water body in its installed condition, the generators may be carried by the floating structure. In the version in which the housing is sunk onto the water bed in its installed condition the generators may be carried by pylons or towers extending from the housing, or possibly from the water bed, to a height greater than the high water level of the body of water.

The turbine(s) can drive separate generators or a single generator. Preferably, the apparatus has one or more hydraulic pumps driven by the or each turbine, and the or each pump is coupled to one or more hydraulic motors to drive a generator. Other forms of drive between the turbines and the generator(s) can alternatively be used such as a direct mechanical drive.

Although the apparatus has particular utility in a tidal flow situation it also has utility in a situation where the flow is in one direction only, but subject to low flow velocities at certain times due to seasonal variations. When designed for a tidal flow situation, the tidal flow will periodically reverse whereby the inlet and outlet will become the outlet and inlet in the other flow direction, and the blades themselves will be suitable for bi-directional flow.

Preferably, the apparatus is in modular form so that a system of a required generating capacity can be formed by assembling two or more modules such modules in side by side relation.

Preferred embodiments of the present invention will now be described by way of example only with reference to the drawings, in which.

Figure 1:
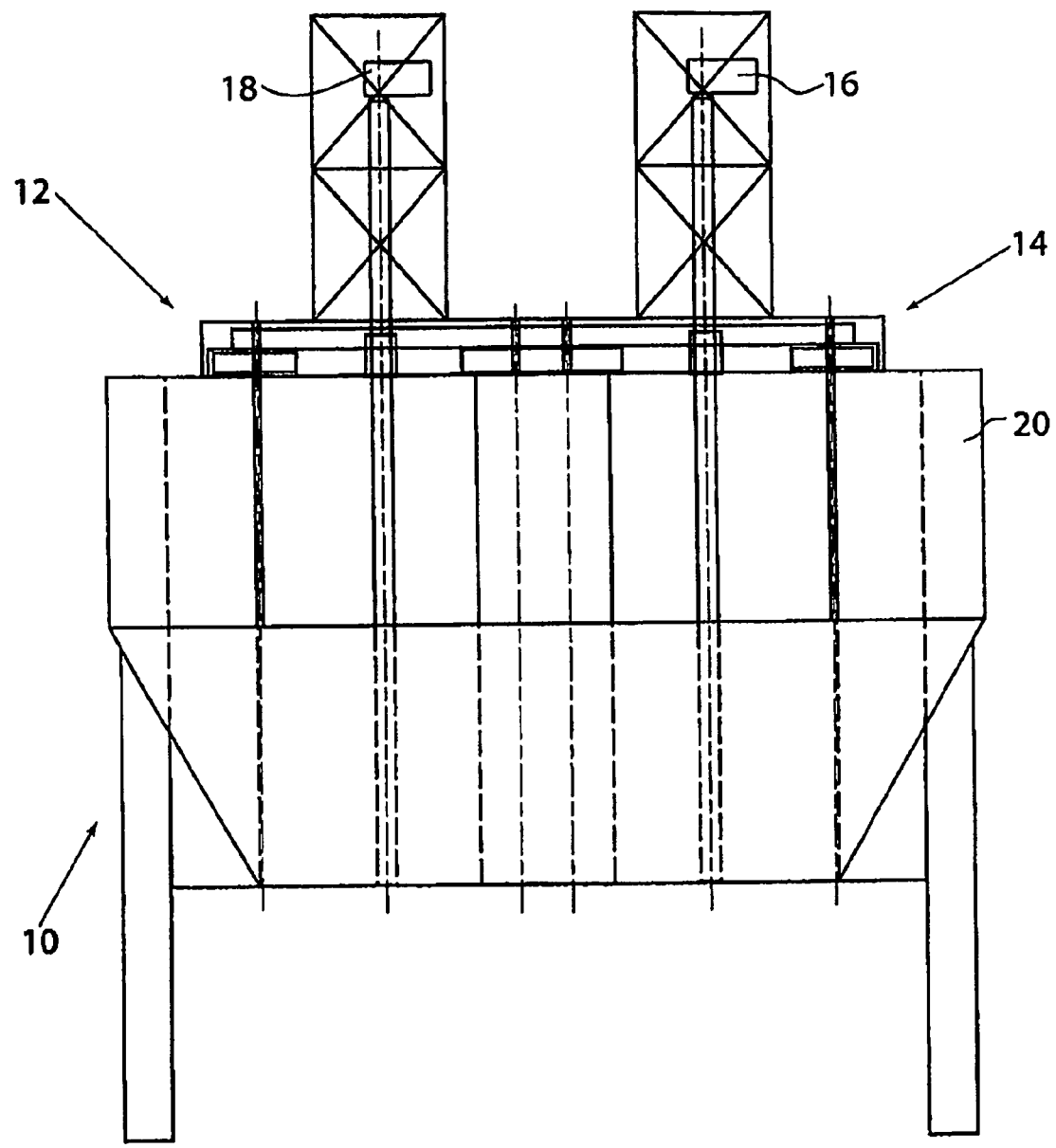
FIG. 1 is an end view of one embodiment of an electricity generating apparatus in accordance with the invention.
Figure 2:
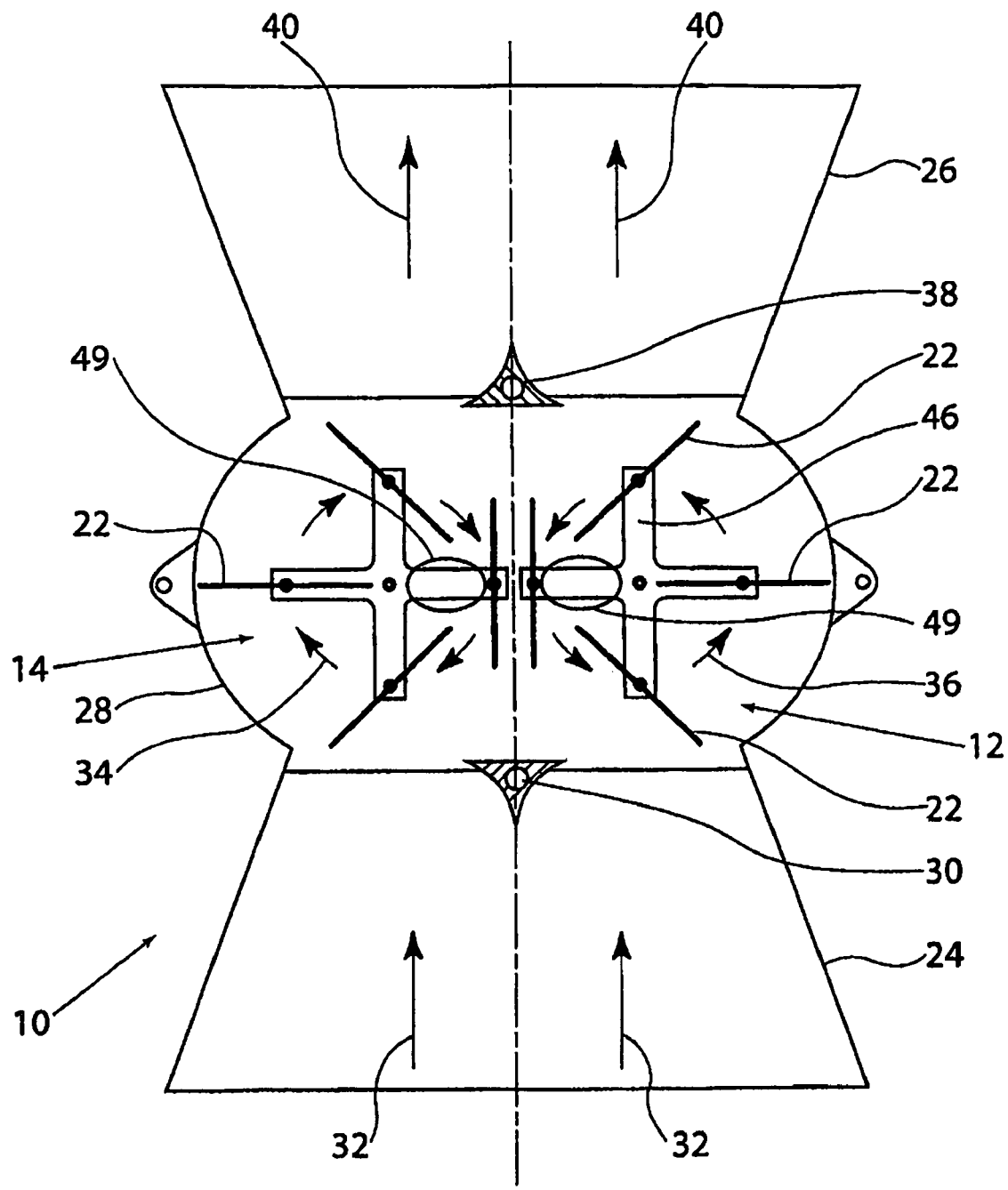
FIG. 2 is a cross-section through the electricity generating apparatus of FIG. 1.

For ease of reference, the apparatus of the preferred embodiments will be described with reference to its application in a sea environment, in particular a tidal estuary or bay. However, it is to be understood that the invention is not so limited and is suitable for use in most situations having a natural water flow such as a river, non-tidal estuary or other water course.

Referring to FIGS. 1 to 4, the electricity generating apparatus 10 has two turbines 12, 14 that are each connected to a generator 16, 18, the two turbines 12, 14 being within a housing 20. As water flows through the housing 20 the water acts on the turbine blades 22 to drive the turbines 12, 14 and thereby generate electricity.

The housing 20 includes an inlet 24, an outlet 26 and a turbine housing section 28. A deflector 30 is situated within the inlet 24 adjacent the turbine housing section 28 so as to split the flow of the water 32 from the inlet 24 principally into two driving water flows 34, 36, one flow for each turbine 12, 14. Each flow 34, 36 is directed towards the outer part or extremity of the turbine housing section 28 so that the turbines 12, 14 rotate in opposite directions. The water flow then exits the housing 20 via the outlet 26 as an outlet flow 40. The flow direction towards the outer parts or extremities of the turbine housing section 28 is also assisted by a stationary baffle within the central part of the housing and which will be described later.

The turbines 12, 14 rotate in synchronism in opposite directions and are adjacent to each other with the angle of the blades 22 being controlled during rotation so that the blades 22 present a large surface area to incoming water flow 32 in the direction of driving rotation of the turbine and small surface area to the incoming water flow 32 in the opposite direction. The blades 22 are uniformly disposed about a central axis and connected to the turbine shaft 44 via a blade supporting structure consisting of upper and lower supports 46 between which the blades are mounted so that each blade is also rotatable relative to the supports 46 about a central vertical axis of the blade. A blade angle control mechanism 48 is attached to the blades 22 so that rotation of the blades 22 with respect to the supports 46 is controlled to thereby change the angle of the blade 22 as the turbine rotates. The blades 22 rotate about their axes at half the rotational speed of the turbine shaft so that each blade 22 is substantially perpendicular to the driving water flow 34, 36 when near the outer extremity of the turbine housing section 28 and substantially parallel to the incoming water flow when near the centre of the turbine housing section 28 and thus when adjacent to the corresponding blade of the other turbine. The rotation of the blade 22 allows for a substantial proportion of the driving water flow 34, 36 to be in contact with the presented large surface area of the blade 22 near the outside of the turbine housing section 28 and minimal water flow to be in contact with the presented small surface area of the blade 22 within the central part of the turbine housing section 28 and which of course engenders a force on the turbine in opposition to the driving force; that opposing force is, however, relatively low as a result of the flow configuration and blade configuration. The rotation of the blades 22 also prevents interference between the two turbines 12, 14 in the central part of the housing section 28 where the peripheries of the two turbines are immediately adjacent.

The housing 20 allows for deployment of the turbines 12, 14 in the incoming water flow 32 without the need for substantial additional construction, such as a dam, whilst capturing and directing the required water flow for the turbines 12, 14. Debris protectors consisting of metal bars extending over the inlet 24 and outlet 26 may also be attached to the housing so that the turbine blades 22 are protected from being damaged by large debris, such as floating logs. Larger marine animals, such as dolphins or whales, are also restricted from entering the turbine section by the debris protectors thereby reducing the risk of injury or death of the marine animal and damage to the turbine 12, 14.

In the embodiment shown, the arrangement of the inlet 24 and outlet 26 enables the apparatus 10 to be used in a bi-directional flow situation, for example tidal flows. In such cases, the inlet 24 in one direction will become the outlet 26 in the other direction, and vice versa. Accordingly, a second deflector 38 is provided in the outlet 26 to split and direct the water flow when in the opposite direction to that shown. However the same embodiment, or with some minor modifications, will also be suited for unidirectional flow for example a river flow.

A stationary baffle 49 is positioned between the upper and lower blade supports 46 and extends vertically, substantially over the length of the blades, from near the central axis of the turbine towards the central part of the turbine housing section 28 to assist in directing the driving water flow 34, 36 around the corresponding outer parts or extremities of the turbine housing section 28 and minimising the flow through the central part of the housing section 28.

The blades 22 in the Figures are shown as flat panels however it should be understood that this is for illustrative purposes only and the actual shape of the cross section of the blades 22 is dependant upon many factors and may vary accordingly.

Figure 4:
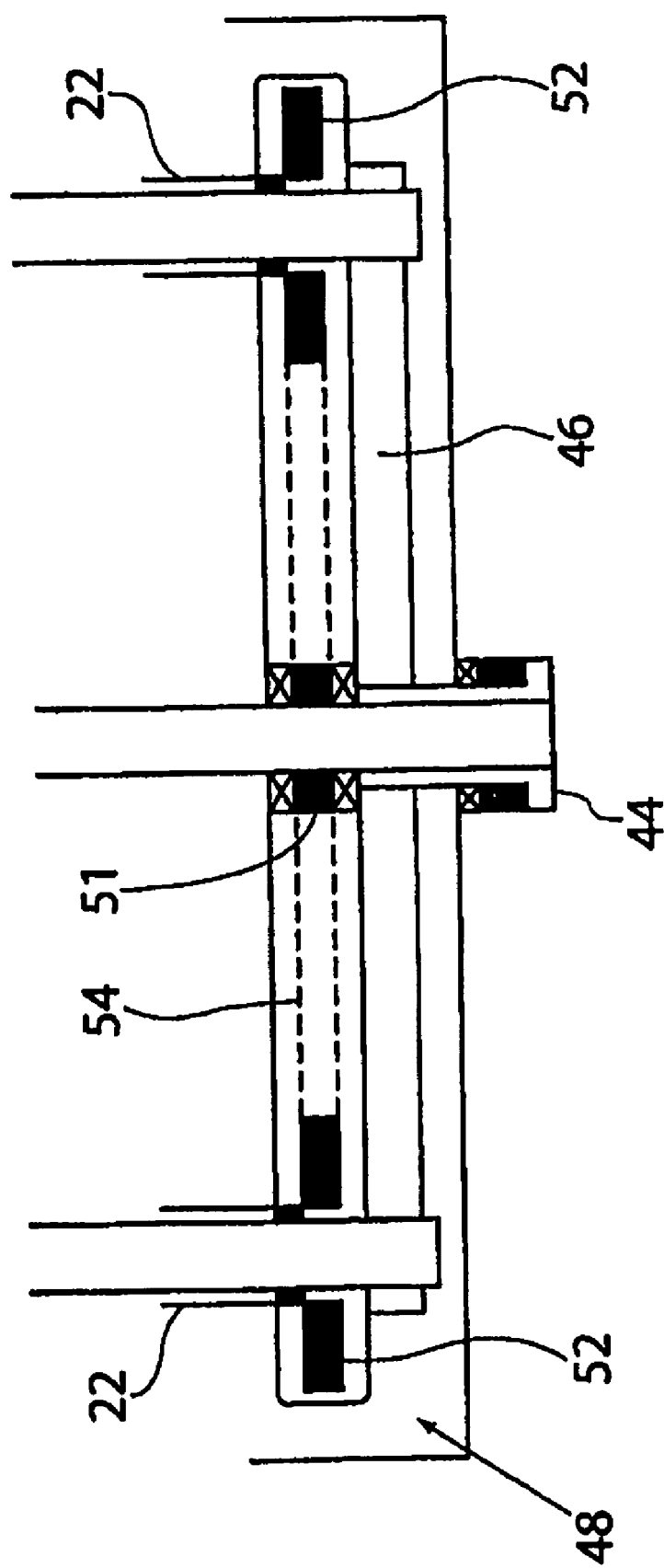
FIG. 4 is a view of one embodiment of the blade angle control mechanism of the electricity generating apparatus.

As described previously, the blade angle control mechanism 48 rotates the blades 22 with respect to their supports 46 and thereby with respect to the main turbine shaft 44. FIG. 4 shows one embodiment of the blade angle control mechanism 48 where a stationary sun gear 51 is connected to rotating planetary gears 52, one attached to a pivot shaft of each blade 22, via a suitable linking system 54 such as a belt, chain or a series of idler gears. Alternatively, the sun gear 51 and planetary gears 52 could be directly intermeshing. The relationship is such that the blades 22 rotate completely about their central vertical axes once every two complete rotations of the turbine.

In the embodiment shown, the turbine 12, 14 is connected to the generator 16, 18 via a hydraulic system including a hydraulic pump driven by the turbine coupled to a hydraulic motor which drives the generator 16, 18, but other types of drive systems could be interposed between the turbine and the generator, and both turbines may drive a common generator. The electricity generated by the generator 16, 18 is supplied to an electricity network or local distribution network via cabling, not shown.

Figure 3:
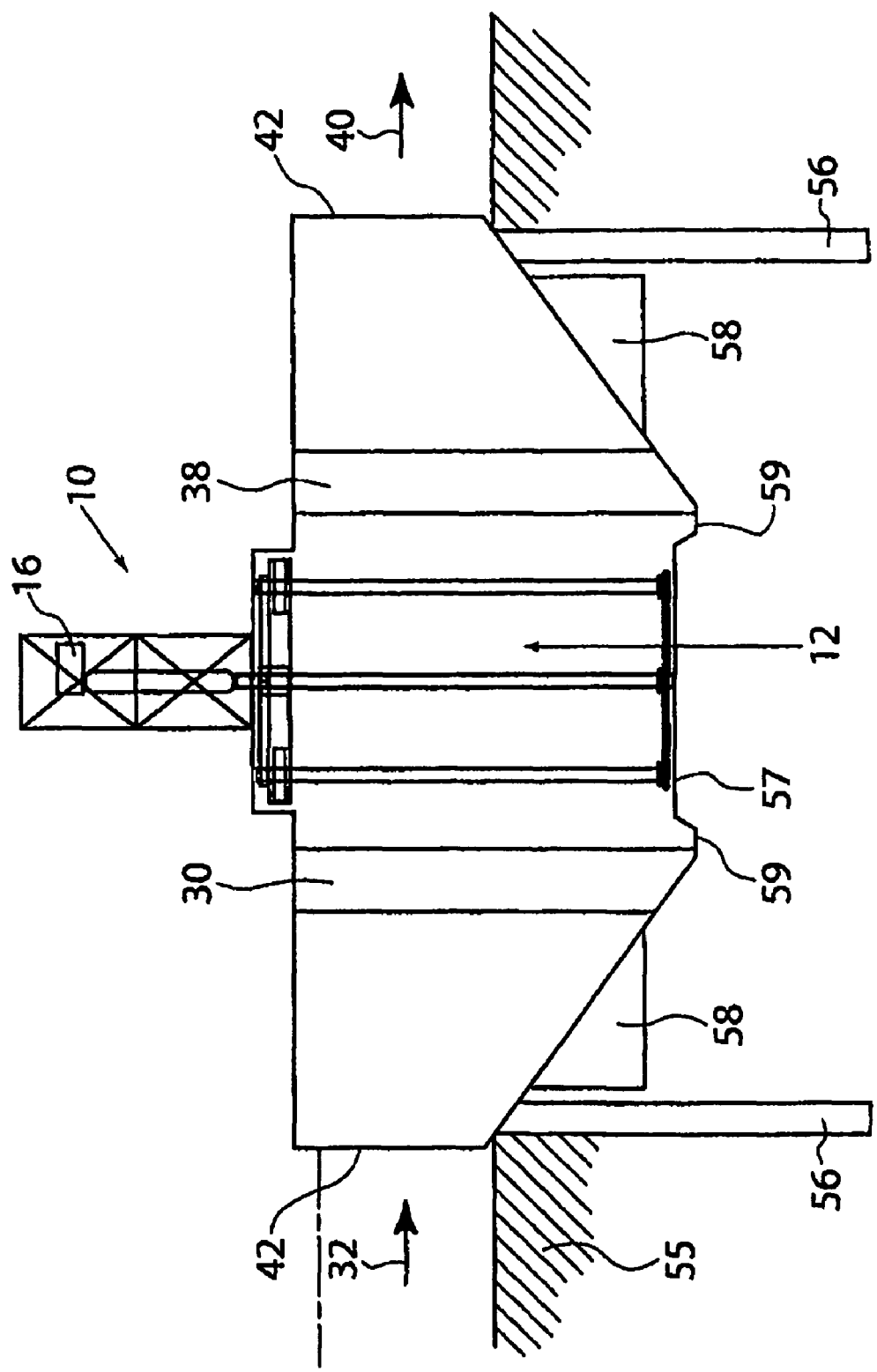
FIG. 3 is a side view of the electricity generating apparatus of FIG. 1.

FIG. 3 shows the electricity generating apparatus 10 installed on the sea bed 55 with piles 56 to anchor the apparatus to the sea bed 55. In a preferred embodiment the apparatus also includes additional floatation devices 58 so that the apparatus can be towed by a vessel into position and then sunk to the sea bed 54. The floor of the housing can be raised in the section, designated 57, where the large blade surface area is presented to the incoming water flow 32. This lessens the leakage of the water flow around the bottom of the blade and creates a silt trap 59. Any silt or sand entering the housing will be forced off the raised section 57 into the silt trap 59 by the rotation of the blades 22 and water flow 34, 36. Further silt and sand will be inclined to settle at the lowest portion of the housing when the water flow is insufficient to rotate the turbine blades.

Figure 5:
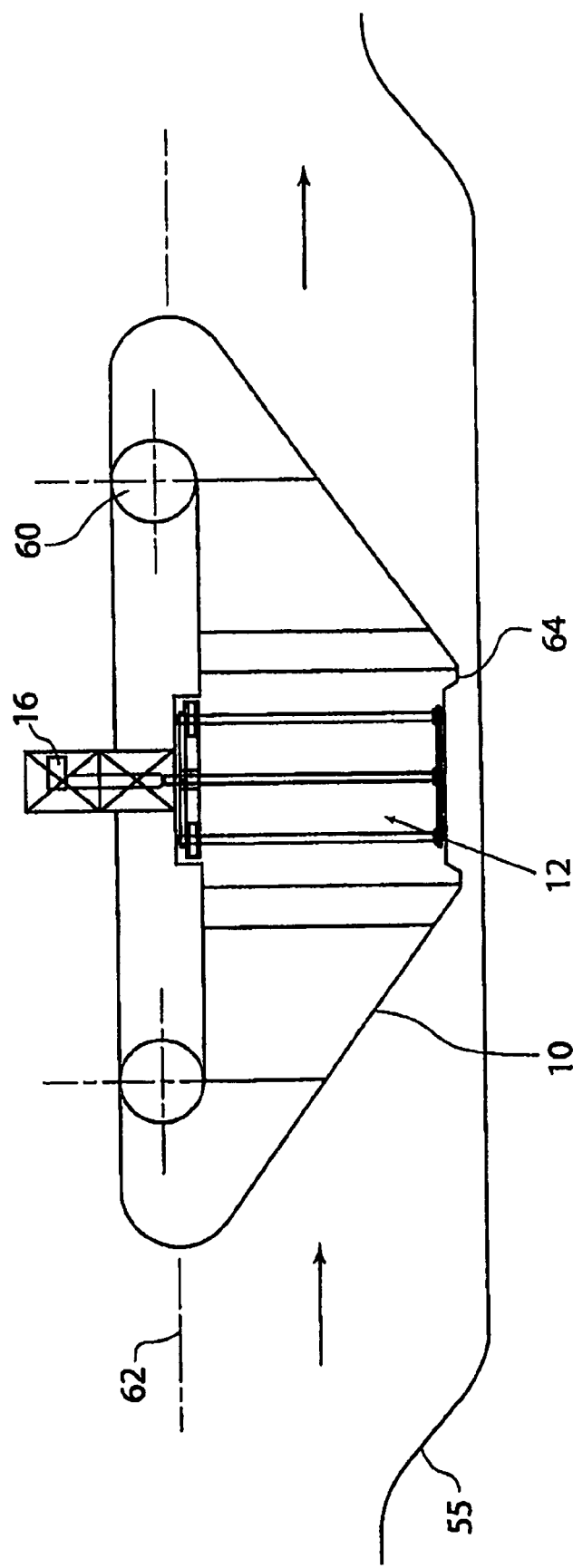
FIG. 5 is a side view of an alternative installation of the electricity generating apparatus of FIG. 1.

In an alternative installation, shown in FIG. 5, the electricity generating apparatus 10, generally as described above with reference to FIG. 2 and 4, includes a floatation device 60 such that the apparatus is able to float at or near the surface of the water 62. In this embodiment, any silt and sand entering the apparatus can exit via outlets 64 in the bottom of the electricity generating apparatus 10. Debris protectors are also installed and extend from the top of the floatation device 60 to the bottom of the inlet and outlet of the electricity generating apparatus 10 to prevent logs or large marine animals from entering the tubrines.

Figure 6:
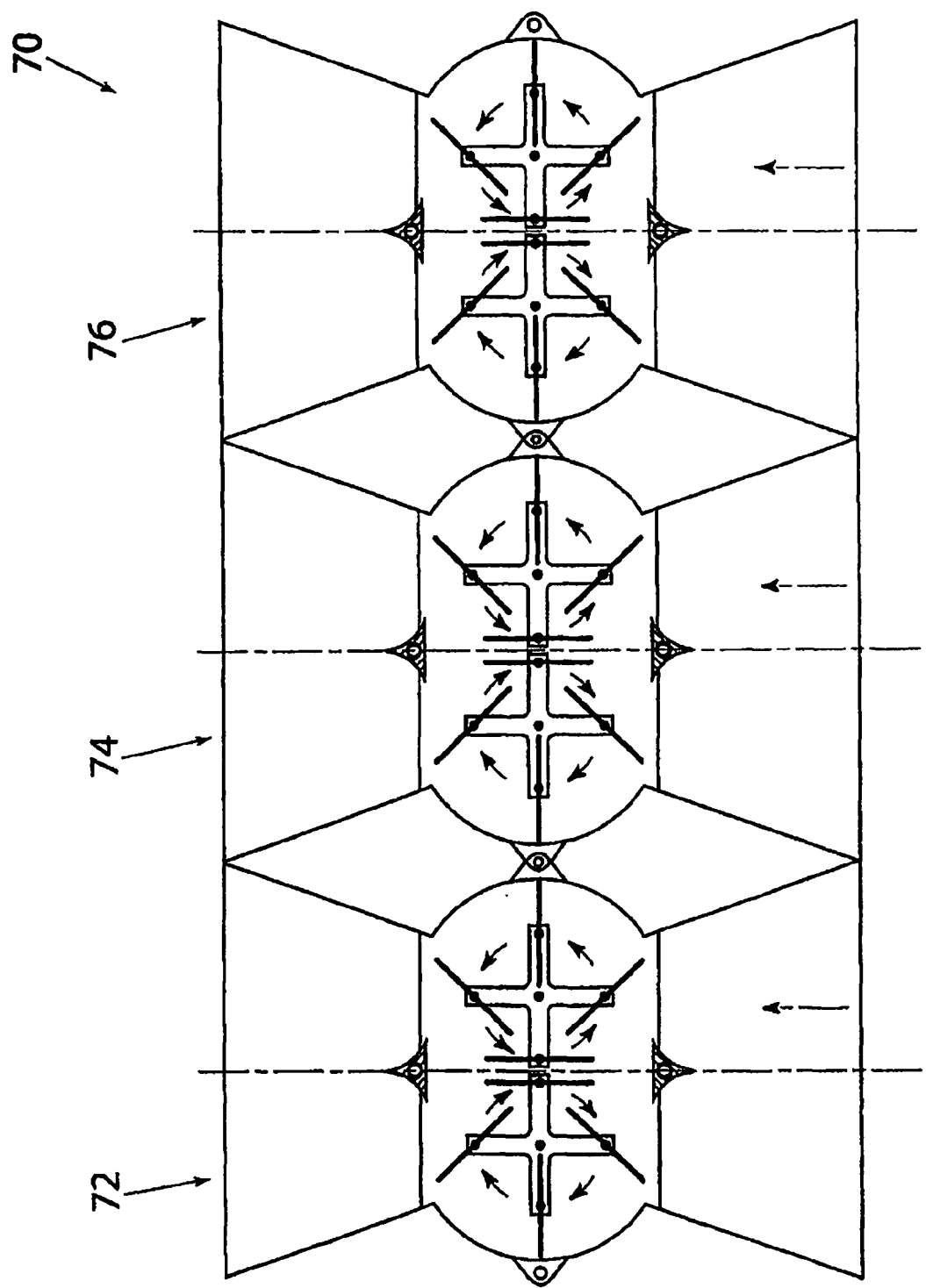
FIG. 6 is cross-section of a generating system constituted by three modular forms of the electricity generating apparatus of FIG. 1.

FIG. 6 shows an electricity generating system 70 formed by three modules 72, 74, 76 each based on the apparatus 10 previously described. The modules 72, 74, 76 have the same internal features as previously described for the electricity generating apparatus shown in FIGS. 1 to 5 and the outside of the housing of the module has been adapted so that it can be connected with other modules. This enables an electricity generating system to be built to a required capacity from two or more module in side by side relation to act in parallel.

Figure 7:
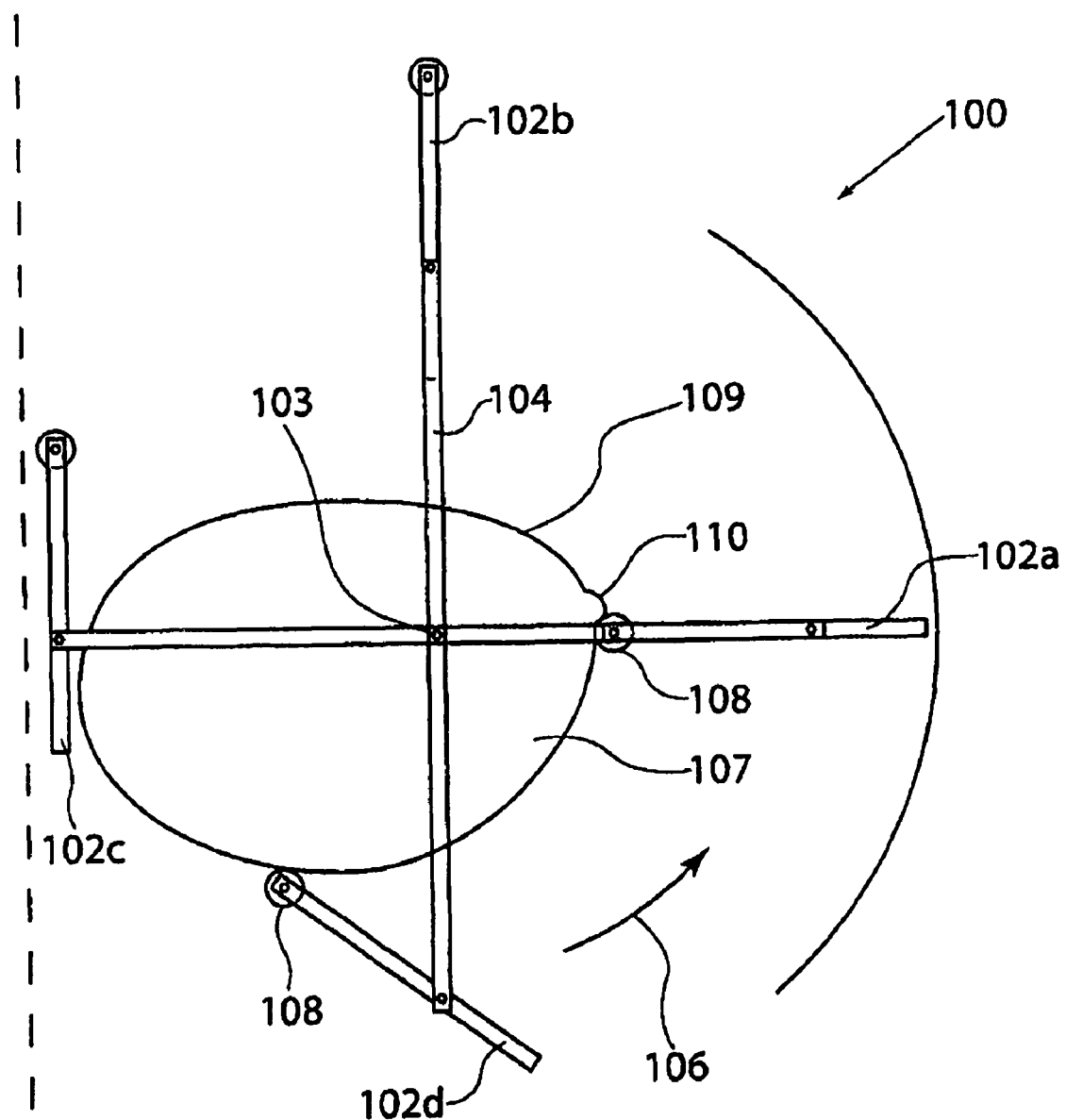
FIG. 7 is a view of an alternative embodiment of the blade angle control mechanism of the electricity generating apparatus.

FIG. 7 shows an alternative embodiment of the blade angle control mechanism. This is illustrated in respect of a turbine 100 of the same basic design as that previously described and having four blades 102a, 102b, 102c, 102d. The blades 102a, 102b, 102c, 102d are connected to the turbine shaft 103 via a blade supporting structure 104. Each blade is extends substantially the vertical height of the turbine housing and is pivotally connected to the blade supporting structure 104 at the upper end of the blade only.

A blade angle control mechanism 107 is provided in the form of a guide 109 of generally cylindrical form extending from the base of the housing, to an upper part of the housing, preferably in one embodiment to just below the supporting structure 104. The guide 109 also assists the directional flow of the driving water flow 106 around the outer periphery of the turbine by acting as a baffle, effectively blocking substantial water flow through the central part of the turbine housing. Rollers 108 or other guide engaging elements attached to an inner edge of each blade are able to travel along at least a portion of the guide 109 so that the angle of each blade with respect to the driving water flow 106 is controlled by the guide at least for a portion of the rotation of the turbine, specifically when the blade is moving through the outer part of the housing where its large surface area is presented to the water flow. The connection point of each blade to the supporting structure 104, and hence its pivotal axis, is offset from the central axis of the blade so as to be closer to its outer edge whereby the forces acting on the blade as a result of the incoming water flow tend to bias the blade so that its rollers 108 are forced into engagement with the guide 109 as it moves across the inlet zone of the housing towards the outer part of the housing as shown for blades 102d, 102a in FIG. 7.

The force of the driving water flow 106 on the blades drives the turbine and forces the rollers 108 onto the guide 109 until the successive blades are at the position shown for blade 102a. At this position, the rollers 108 are restrained from further movement along the guide 109 by a restraining portion 110 in the form of a projection from the general shape of the guide 109. The driving water flow 106 continues to provide a rotational force to the turbine but as the turbine, and hence the blade supporting structure 104, rotates, the blade 102a will become more inclined to the water flow as a result of its restraint at its inner edge until such a point that its inner edge is forced to release from the restrining position 110. At this point, the blade 102a will "flip" to a position where the blade 102b is substantially parallel to the water flow at this point as a result of the "weather vane" effect due to the offset pivotal mounting. As the turbine rotates further, the blade will remain substantially parallel to the water flow as a result of this effect as shown for blades 102b and 102c.

As such the successive blades remain substantially perpendicular to the driving water flow 106 when near the outer extremity of the turbine housing section 100 and substantially parallel to the water flow when near the centre of the turbine housing section and thus when adjacent to the corresponding blade of the other turbine. The rotation of the blade 102 allows for a substantial proportion of the water flow 106 to be in contact with the blade near the outer part or extremity of the turbine housing section and minimal water flow to be in contact with the blade within the central part of the turbine housing section. As the blade moves towards the inlet zone, its exposure to the incoming water flow causes its inner edge to be forced back towards the guide 109 so that its rollers 108 engage the guide over the subsequent part of its rotation, as shown for blade 102*d*.

Although the preferred embodiments have been described with two adjacent vertical axis turbines, a single turbine of the present invention can be installed in a housing to form an electricity generating apparatus.

The above embodiments of the present invention have been described by way of example only and modifications and variations may be made without departing from the spirit and scope of the invention described.

The invention claimed is:

1. An Apparatus for generating electrical power from a flow of water, including:
    a housing having a water inlet and water outlet,
    a turbine mounted in the housing for rotation about an axis and having a turbine shaft and a set of blades,
    the housing being adapted to be mounted within the body of water and being so configured that water flows into the housing via the inlet, and is principally directed into a driving flow for the turbine, and is then directed for discharge via the outlet,
    wherein the turbine is provided with a blade angle control mechanism configured to control the angles of the blades with respect to the driving flow such that each blade rotates about a respective axis at half the rotational speed of the turbine shaft, whereby a large blade surface area is presented to incoming water flow for driving the turbine in a predetermined direction of rotation and a small blade surface area is presented to the incoming water flow in a direction opposite to the driving direction,
    the apparatus further including a baffle positioned such that the set of blades rotates therearound, for directing the driving flow to a peripheral part of the turbine.

2. An apparatus according to claim 1, further comprising a further turbine having a further turbine shaft and a set of further blades and being provided with a further blade angle control mechanism, the further turbine being mounted in the housing adjacent to the said turbine for rotation about an axis which is parallel to that of the said turbine, wherein the housing is so configured that the incoming water flow is principally directed into two driving flows, one for each turbine, and wherein the further blade angle control mechanism is configured to control the angles of the further blades with respect to the driving flow for the further turbine such that each further blade rotates about a respective axis at half the rotational speed of the further shaft, whereby a large blade surface area is presented to the incoming water flow for driving the further turbine in a predetermined direction of rotation and a small blade surface area is presented to the incoming water flow in a direction opposite to the driving direction of the further turbine, the apparatus further including a further baffle positioned such that the set of further blades rotates therearound, for directing the driving flow for the further turbine to a peripheral part of the further turbine.

3. An apparatus according to claim 2, wherein the two turbines are coupled for synchronous rotation in opposite directions with the incoming water flow being directed towards an outer peripheral part of each turbine in which the large blade surface area is presented.

4. An apparatus according to claim 1 or 2, wherein the blade angle control mechanism and the further blade angle control mechanism each comprises a planetary gear system having planet gears each of which is linked to a respective one of the blades, and a stationary sun gear co-axial with the turbine axis, with which the planet gears are engaged, whereby the blades are pivoted to change their angles as the turbine rotates.

5. An apparatus according to claim 4, wherein the sun gear is engaged with the planet gears via a linking system.

6. An apparatus according to claim 5, wherein the linking system comprises a chain.

7. An apparatus according to claim 5, wherein the linking system comprises a belt.

8. An apparatus according to claim 5, wherein the linking system comprises a series of idler gears.

9. An apparatus according to claim 4, wherein the sun gear is directly intermeshing with the planet gears engaged therewith.

10. An apparatus according to claim 1, wherein the housing is carried by and/or forms part of a floating structure.

11. An apparatus according to claim 1, wherein the housing in the installed condition is anchored adjacent to a bed of the water.

12. An apparatus according to claim 1, having one or more hydraulic pumps driven by the or each turbine, the or each pump being coupled to one or more hydraulic motors driven to drive a generator.

13. An apparatus according to claim 1, the apparatus being in the form of a module so that a system of a required generating capacity can be formed by assembling two or more such modules in side by side relation to act in parallel.

14. An apparatus according to claim 2, wherein the turbine and the further turbine are each coupled for synchronous rotation in opposite directions with the incoming water flow being directed towards an outer peripheral part of each turbine in which the large surface area is presented to the water flow.

15. An apparatus according to claim 14, wherein a deflector is provided in the outer inlet to direct the incoming water flow into the two driving water flows towards respective outer parts of the housing.

16. An apparatus according to claim 15, wherein each of the blade angle control mechanism and the further blade angle control mechanism is operative to control the blade angle such that a low blade surface area is presented when each blade is moving through a central part of the housing, to reduce opposing forces acting on the respective turbine in the central part and to prevent interference between the blades of the two turbines in the central part.

17. An apparatus according to claim 1, wherein the axis of the turbine is substantially vertical.

\* \* \* \* \*